Oct. 12, 1965   G. C. F. ASKER   3,210,954
DEHUMIDIFYING CONTROL
Filed Aug. 9, 1963   2 Sheets-Sheet 1
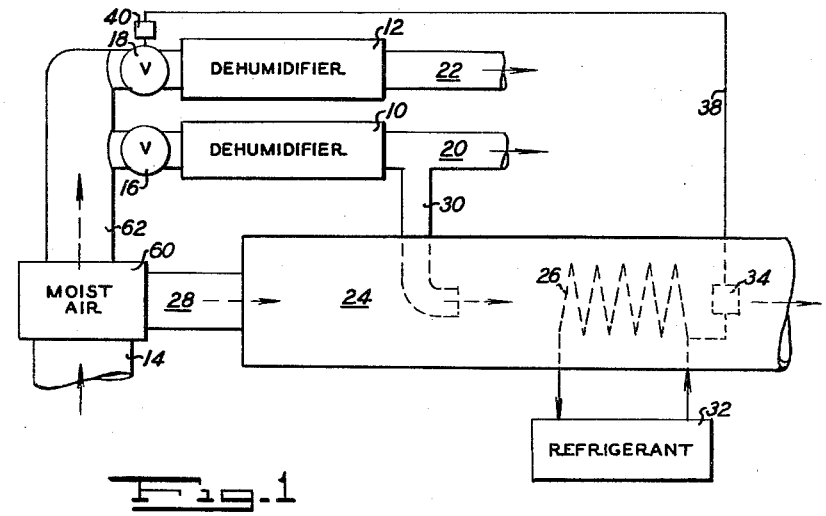
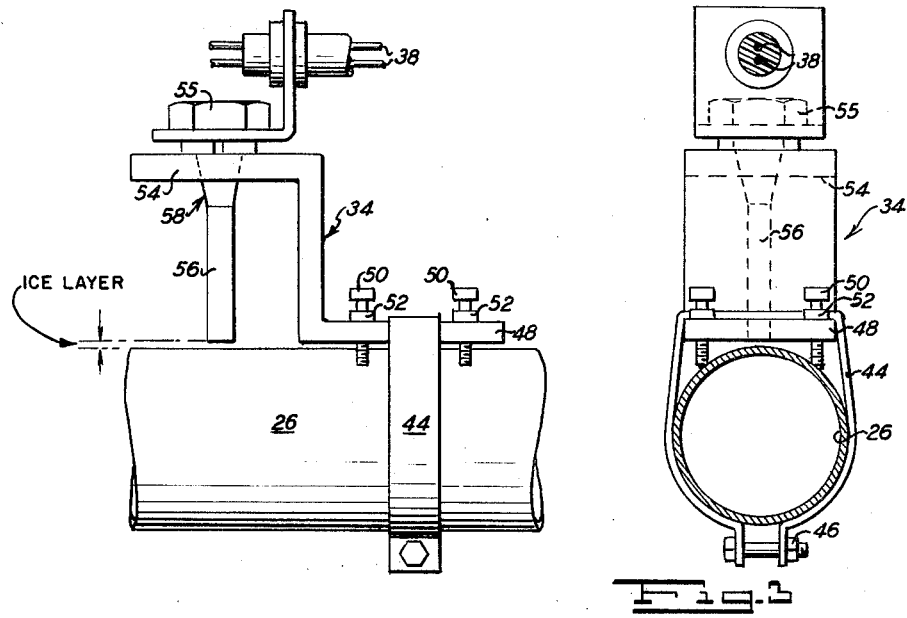
INVENTOR
GUNNAR C. F. ASKER
BY
*Sol B. Wiss*
ATTORNEY Oct. 12, 1965  G. C. F. ASKER  3,210,954
DEHUMIDIFYING CONTROL
Filed Aug. 9, 1963  2 Sheets-Sheet 2
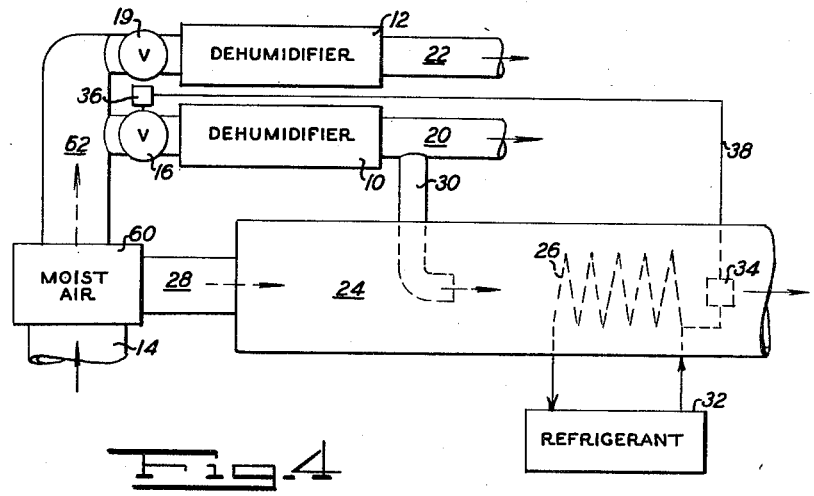
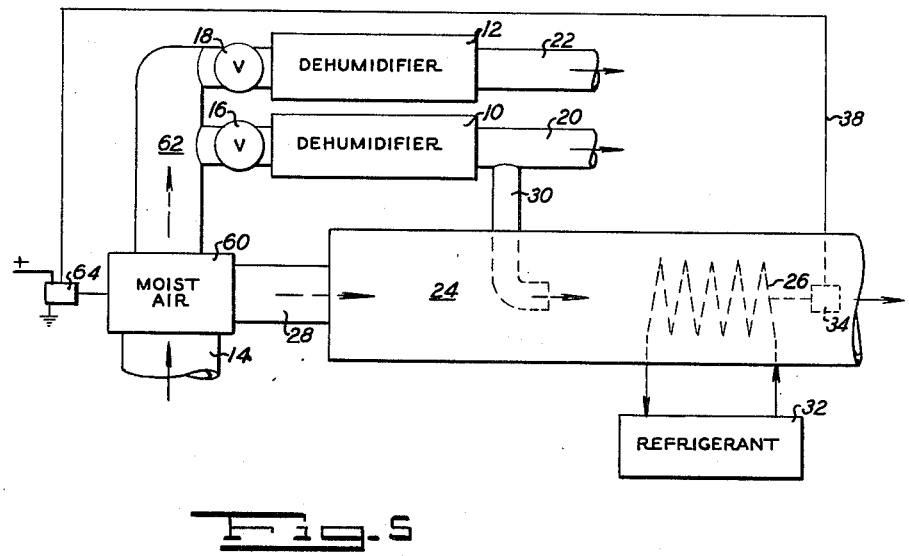
INVENTOR
GUNNAR C. F. ASKER
BY
*Sol B. Wiesen*
ATTORNEY United States Patent Office 3,210,954
Patented Oct. 12, 1965

3,210,954
DEHUMIDIFYING CONTROL
Gunnar C. F. Asker, Princeton, N.J., assignor to Cargocaire Engineering Corporation, New York, N.Y., a corporation of New Jersey
Filed Aug. 9, 1963, Ser. No. 300,995
10 Claims. (Cl. 62—93)

This invention relates to a system for controlled regulation of the humidity of gas, such as air, in improved efficiency. More particularly, the invention defines an improved control of a dehumidifying device, including refrigeration, wherein the icing of the refrigeration coils serves as a sensor for controlling the humidity of the air and the amount of dehumidification applied thereto.

It is often useful to apply some cooling to air in moisture conditioned spaces, at least to offset the rise in the temperature by the latent heat of the removed water released in the dehumidification, as is known in the art. Moreover, where cooling is supplied by evaporation of surface moisture, the air must be dehumidified to maintain a low moisture content to produce a moisture avid air. The cooling of air by any process is more efficient where cooling coils have a layer of moisture on them greatly enhancing their heat transfer thereby. Consequently, it is not desirable in an air conditioning system, wherein both substantial cooling and moisture control are applied, to dry the air to an extreme degree. Again, simple economy dictates the desire to reduce the moisture to a practical level, and no lower, applying for this reason only enough moisture adsorbent bed capacity as is needed for the particular dehumidification job. Such close but intermediate moisture content control has been difficult.

The present invention provides such control combining a dehumidifying desiccant bed with the useful characteristics of a refrigeration coil, the latter used either in a pilot capacity; that is, only a small refrigeration coil sufficient to provide a condensed film of moisture thereon—ice, serving as a sensor for control for actuating one or two variable capacity adsorptive dehumidifying devices; or the same control effect may also result where a large enough cooling coil is used to simultaneously effect substantial gas cooling.

Accordingly, in its broadest aspect the invention relates to a combination of a cooling means comprising at least a cooling coil of sufficient size upon which will be deposited moisture from air being conditioned in the system to be controlled, and thus forming a film of ice upon such cooling coil, such ice being used as a control when there is a sufficient accumulation to activate a dehumidifier. Such dehumidifier serves to remove moisture from the ambient air and is here controlled to such degree that so little ice may be deposited that further dehumidification is unnecessary. Such cooling coil thus acts as a sensor of moisture content in the air in contact therewith and thus controls the activation and deactivation of the dehumidifier.

In another aspect of the invention, the cooling coils of a refrigeration system (particularly where the temperature is to be maintained below 32° F.) are maintained in substantially optimum heat transfer condition by using the refrigeration system in combination with a dehumidifier which is activated by accumulation of ice upon the refrigeration coil. A consequence is that the dehumidifier will not operate unless the coil does have a film of ice thereon whereby the heat transfer of such ice coated coil is superior to a dry coil, and excessive dehumidification will not be supplied by the dehumidifier; that is, it will not be operative until a substantial quantity of ice is available upon the cooling coil. Other incidental advantages of this system are inherent.

The invention is further explained in relation to the drawings appended hereto in which:

FIG. 1 illustrates diagrammatically the overall system;
FIG. 2 illustrates the mounting and operation of a temperature sensing and dehumidifier activating device;
FIG. 3 is an end view of FIG. 2;
FIG. 4 is a modified form of FIG. 1 illustrating operation of intermittent variation of dehumidifier capacity; and
FIG. 5 is a further modified form illustrating operation of the system by variation of air flow speeds.

As illustrated in FIGS. 1 and 4, the system comprises one or several dehumidifying units 10, 12, etc. supplied with air from an ambient air duct 14, passing the same to either one or the several dehumidifiers 10, 12, etc. through branched ducts, the dehumidified air passing outward through ducts 20 and 22. The one or several dehumidifiers 10, 12, etc. containing desiccant materials disposed conventionally in a bed therein have a single or combined capacity to produce air dried to any desired degree. For this purpose only one dehumidifier 10 of large enough capacity may be operated intermittently, as shown in FIG. 4 to control the desired humidity in the selected space, or the dehumidifier 10 may be operated continuously and an additional dehumidifier 12, etc. may be added to the system intermittently to increase its drying capacity from time to time as increased dehumidification is desired to produce whatever degree of drying is needed and selected, as shown in FIG. 4.

If the air entering from duct 28 contains enough moisture, cooling coil 26 will cause its condensation thereon. A continuous flow of dry air is also led into the duct 24 taken through duct 30 as a relatively small, pilot volume, diversion from dry air outlet 20. Consequently, the duct 24 receives both a continuous flow of dry air from duct 30 and moisture containing air from duct 28 and it is this mixture which passes over the cooling coil 26. The flow of dry air from duct 30 is available continuously where, according to the system of FIGS. 1 and 5, the dehumidifier 10 operates continuously, and intermittently where, according to the system of FIG. 4, the dehumidifier 10 operates intermittently.

The cooling coil 26 will be supplied with a suitable cold refrigerant from any useful source 32. When the combined dry and moisture containing air from ducts 28 and 30 have a dewpoint above the temperature to which the mixture will be cooled on passing over the coil 26, then they will deposit moisture and build up an ice layer thereon. On the other hand, if the ambient air entering through duct 14 and diverted through duct 28 contains very little moisture, the mixture with the dry air from duct 30 may have a dewpoint too low to deposit any moisture on the cooling coils 26. On the contrary, that mixture will evaporate moisture from earlier deposits on coil 26 and thereby begin to remove the ice deposit thereon.

A thermo-sensing device such as thermo-switch 34 is mounted in the duct 24 and in operative combination with the coil 26 for being activated by the layer of deposit of ice thereon. The thermo-switch 34 in alternate modification of FIGS. 1, 4 and 5 can operate a solenoid control 36 on valve 16 to the dehumidifier 10 through line 38 (FIG. 4); and the same current in the alternate modification of FIG. 1 will operate valve 18 through solenoid 40 on the dehumidifier 12, etc., when two dehumidifiers are used; and will drive fan motor 64 at variable speeds as shown in FIG. 5. That thermoswitch control 34 and solenoid 36 will operate to open valve 16 where, as in FIG. 4, dehumidifier 10 is the only unit available or to open or close valve 18 where, as in FIG. 1, several dehumidifiers 12, etc. are available in the system. Consequently, depending upon whether there is a sufficient layer of ice formed on the cooling coil 26, indicating substantial moisture in the system, a valve 16 according to the system of FIG. 4 or a valve 18 according to the system of FIG. 1 comprising one or more dehumidifiers 10 or 12 will be opened and the moist air then will pass through dehumidifiers 10 and 12 until the moisture in the ambient air entering through duct 14 is reduced. Where the moisture in the ambient air has been so reduced that an insufficient ice layer is formed on the cooling coil 26, then the valves 16 and 18 of the several dehumidifiers in the system will be actuated to closed position, stopping the dehumidification, or reducing the capacity of the dehumidifiers by withdrawing one of a number in the system, whereby the amount of dehumidification is reduced. The moisture in the ambient air passed through ducts 14 and 28 will then tend to build up in the system and an ice deposit again reappear on the refrigeration coil 26. The cycle will then be repeated as actuated by the ice layer and the thermo switch 34 to open the valves to one or more dehumidifiers as air drying capacity is needed.

FIG. 2 is an enlarged detail showing the mounting of the temperature sensing and control unit 34 upon the cooling coil 26. For this purpose a band-like bracket 44 is fastened with a bolt 46 for adjustable support about the coil pipe 26. A Z-bracket having a lower bar 48 is held by the band 44 for support thereof against the pipe 26. Several adjusting studs 50 disposed on either side of the bracket are threaded through the Z-bar 48 for adjustment of the tension of the band 44 against and thus adjustably supporting the Z-bracket against the duct 26. The position of the bracket bar 48 with respect to the duct 26 is carefully adjusted by the position of the studs 50 and bolt 46. Nuts 52 are mounted above the bar 48 and about the studs 50, securing the position of the Z-bracket to the right position so that the nuts 52 serve to retain the setting thereof against displacement of its adjusted position on duct 26 in use. The upper end 54 of the Z-bracket supports a temperature sensing element 56. The temperature sensing element 56, as will be noted, extends downward with its temperature-sensitive end closely spaced from the refrigerant duct 26 a small fractional end distance of about $\frac{1}{32}$ to $\frac{1}{16}''$, whereby that small air gap separates the temperature-sensitive element 56. That exact distance is set by the adjusting studs 50 to whatever is selected. By known construction, depending upon the setting achieved by adjustment of the upper nut 55 of the sensing element, a temperature responsive current is generated in the thermoswitch sensing arm 56, made or broken by a bi-metallic element (not shown) depending upon the exact setting of the thermo-switch adjustment 55. That thermo switch 58 is fastened in circuit with current bearing lines 60 so that the current therein will flow or be stopped depending upon the critical temperature actuation by the sensing element 56. In operation, an ice layer deposits on duct 26 and when the layer increases to the preset distance between the arrows, sufficient to activate the sensing element 56, the circuit through the thermo switch 58 and line 38 will be closed. In this manner, the valve 16, according to the system of FIG. 4, or valve 18, according to the system of FIG. 1, with one or more dehumidifying units as used in the system will be opened by solenoids 36 or 40, activating the dehumidifier 10 or 12, etc.

The coil 26 disposed within the duct 24 need be only a small pilot refrigerating coil operated by a tiny refrigeration compressor system, sufficient to operate as a control device for the dehumidifying system. For that purpose it may comprise a small coil loop 26 only large enough to mount a temperature sensing and thermo switch unit for control of an adsorbent dehumidifier and cause such to operate to maintain the humidity in any enclosed space at any practical or comfortable selected dewpoint. Such refrigerating coil 26 in that pilot or control capacity has only enough capacity to form a cold target upon which ice may accumulate as a temperature sensing control element upon the amount of moisture in the air; that is, for activating and deactivating a dehumidifier system; or to the same effect to increase or decrease the dehumidifying capacity of a continuously operating dehumidifying system.

However, it is feasible in modified construction to use a large duct 24, or a series of such ducts of sufficient capacity to house a large number of cooling coils, sufficient to impart to a large portion of the circulating air a substantial cooling coil heat exchange service, thus to maintain a preselected low temperature control upon a large air conditioning system. This system, in long operation, thus maintains a continuous layer of moisture or ice on the coils. The controls of the dehumidifiers in such large cooling system through humidity sensing device and control device actuated by the layer of ice formed on the larger refrigeration coil, operates in the same manner as described.

While the operation of a thermo switch 58 responsive to the cooling of a temperature-sensing device 56 by the film of ice built up on the refrigeration coil was described, an activating circuit for valve control of a dehumidifier can also be closed by a similar film of ice, decreasing the actual conductivity between a pair of separated electrodes. Hence, the actual principal of sensing the presence of a layer of ice is subject to some variation although applicant prefers the temperature sensing rather than the ice conductivity principal of operation. In either case, the depth of the layer of ice can be preselected and the setting adjusted as desired to operate upon the selected thickness of the ice layer. The electric solenoid control upon the valves of one or more dehumidifiers may be of standard commercial construction. FIG. 4 shows a standard wiring diagram for a solenoid valve actuated by the small pilot circuit of the thermo switch.

The system, it will be understood, can operate by the use of the single dehumidifier 10 according to the system of FIG. 4 which will operate intermittently being cut off when the air in the system is sufficiently dry to need no dehumidification and of consequence that inactive position of the dehumidifier 10 is caused by the closing of the solenoid 36 and in consequence the valve 16 is controlled thereby. When the moisture accumulates in the system sufficient to build up a layer of ice on the coil 26, for instance by passage of moist air from the duct 28 over the coil, the flow being circulated by a fan 60 in the inlet duct 14, then the solenoid 36 will cause the dehumidifier 10 to become operative by opening of the valve 16. The dehumidifier 10, however, may be used in a system as shown in FIG. 1 by which it operates continuously to remove moisture from the air and, for that use, valve 16 will be continuously open and the solenoid 36 and its operating circuit may be omitted. Where the design of the dehumidifier is such that it cannot remove as much moisture as may be needed; that is, the design is too small for the amount of air to be dried, it would be used with a second dehumidifier 12 and combined capacities being more than sufficient to dry the air in the given system. With that arrangement, as shown, the temperature sensing and control element would need to operate only the single dehumidifier 12, intermittently opening and closing valve 18 by alternate positions of its solenoid 40 activated by line 42, with the dehumidifier 10 therefore operating continuously in combination with the intermittently operating dehumidifier 12 to control the overall system.

While it is possible to use a series of dehumidifiers thus activating some only as needed for the final close control of the moisture in the system, that same effect of varying the air drying capacity of such system may also be produced by operating the fan 60 circulating the air through the dehumidifier 10 or both 10 and 12 at a variable rate controlled from the circuit line 42 by shunt control to activate a motor 64, driving the fan 60 at a higher or lower rate as shown in FIG. 5. In this manner the air to be dried may be continuously circulated, but the volume of air treated by the dehumidifier is varied to produce the desired humidity control.

The system is capable of use with additional benefits. By selective sizing of ducts 28 and 30 or insertion of constricting valves (not shown), the volume of gases passing as ambient moisture-laden gas through duct 28 and dried gas in duct 30 may be adjusted. That adjustment, in combination with the cooling coil 26, serves several purposes. It helps to more accurately control the dew point of the ambient air, as desired. Where the duct 24 is large enough to carry sufficient air, with correspondingly increased quantities of air from ducts 28 and 30, a substantial cooling effect is imparted to the ambient air by admixture with the large volume of controllably cooled air emitted from the duct 24 after cooling contact with the correspondingly sized cooling coils 26. For instance, if a large portion up to one half of the air, more or less, passing through duct 14 is passed through duct 28 and substantially cooled in duct 24, that large volume of relatively cold air emitted from duct 24 admixed with ambient dry air from ducts 20 and 22 serves to produce a controlled cooling effect to the air space being conditioned. Moreover, that cooling is more efficient by the condensed moisture with its improved heat transfer from the coil 26. In that manner a close temperature as well as humidity control is available while still maintaining an overall control thereon by the thermo-sensing device described.

Certain modifications will occur to those skilled in the art and, accordingly, it is intended that the description given be regarded as illustrative and not limiting except as defined in the claims appended hereto.

I claim:

1. In an air conditioning system, a desiccant dehumidifier connected to a supply of ambient air, means for varying the quantity of air passed to said dehumidifier to be dehumidified, and a refrigeration coil, said means for varying the quantity of air to be dehumidified being responsive to the depth of a layer of ice formed on said coil, and means for continuously passing some of the ambient air of the system over said refrigeration coil whereby ice may be deposited thereon responsive to its dew point.

2. In an air conditioning system, a desiccant dehumidifier connected to a supply of ambient air, means for varying the quantity of air passed to said dehumidifier to be dehumidified, a refrigeration coil, means for passing a selected portion of the ambient air and a portion of the dehumidified air in admixture over said refrigeration coil, said means for varying the quantity of air to be dehumidified being responsive to the depth of a layer of ice formed on said coil by deposit from said mixture of ambient and dehumidified air responsive to the dew point thereof.

3. The system of claim 1 wherein the dehumidifier is a plurality of desiccant beds each independently capable of drying air passed therethrough and said means for varying the quantity of air to be dehumidified intermittently activates at least one of said beds as needed to provide the requisite dehumidification capacity as controlled by temperature response to said ice layer.

4. The system as defined in claim 1 wherein the means for varying the quantity of air to be dehumidified comprises a variable capacity gas blower means activated to blow a variable quantity of air as controlled by temperature response to said layer of ice.

5. The system defined in claim 1 wherein the means responsive to said layer of ice comprises a thermo-sensitive electrical switch, several desiccant dehumidifiers through which ambient air is passed, inlet valves on said dehumidifiers, and means responsive to said switch for opening at least one of said air inlet valves.

6. The apparatus as defined in claim 2 wherein the means for varying the quantity of air to be dehumidified is a thermo-sensing control to activate additional desiccant capacity, said control being actuated by the temperature of a layer of ice deposited on said coil to actuating proximity to the thermo-sensing element thereof by deposition, said ice layer being formed in passage of a mixture of both ambient and desiccant dehumidified air thereover.

7. The apparatus as defined in claim 1 wherein said refrigeration coil is of sufficient refrigeration capacity, and the ambient air passed thereover is in sufficient volume to reduce the overall temperature of the air in said conditioning system.

8. The process of controlling the dew point of air in an air circulating and conditioning system comprising passing a stream of ambient air in said system in admixture with a stream of dehumidified air over a cooling coil and dehumidifying variable quantities of air circulating through said system in response to the quantity of ice deposited on said cooling coil.

9. The process of controlling the temperature and dew point of air in an air circulating system and conditioning system, comprising passing a stream in sufficient quantity of ambient air in said system in admixture with a stream of dehumidified air over a cooling coil of sufficient capacity, with respect to the total system, to control the temperature of the total system by cooling of the air passed thereover, and varying the dehumidifying capacity of said system to a desired dew point of said ambient air in response to the thickness of a layer of ice deposited on said cooling coil.

10. The method of controlling the dew point and temperature of an air cooling and conditioning system comprising circulating a stream consisting of a mixture of ambient and desiccant dehumidified air over a cooling coil of sufficient capacity to cool said stream and in turn the air in said system upon co-mingling with said cooled air stream and deposit moisture on said coil from said ambient air containing mixture when the dew point is high, and increasing the dehumidification applied to said ambient air in said system responsive to the formation of an ice layer of selected depth on said cooling coils.

References Cited by the Examiner

UNITED STATES PATENTS

| | | | |
|---|---|---|---|
| 1,819,643 | 8/31 | Fleisher | 62—94 |
| 1,945,441 | 1/34 | Miller | 62—94 |
| 2,085,964 | 7/37 | Fonda | 62—94 |
| 2,117,104 | 5/38 | Rorison | 62—140 |
| 2,200,945 | 5/40 | Ashley | 62—94 |
| 2,421,819 | 6/47 | Vandenberg | 62—139 |
| 2,506,775 | 5/50 | Calabrese | 62—139 |

WILLIAM J. WYE, *Primary Examiner.*

ROBERT A. O'LEARY, *Examiner.*